(12) United States Patent
Postgate et al.

(10) Patent No.: US 11,549,742 B2
(45) Date of Patent: Jan. 10, 2023

(54) CURTAIN TRACK SEAL

(71) Applicant: Carrier Corporation, Palm Beach Gardens, FL (US)

(72) Inventors: Farley William Postgate, Syracuse, NY (US); Robert C. Spearing, Marietta, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 219 days.

(21) Appl. No.: 16/621,202

(22) PCT Filed: Jun. 22, 2018

(86) PCT No.: PCT/US2018/038974
§ 371 (c)(1),
(2) Date: Dec. 10, 2019

(87) PCT Pub. No.: WO2018/237254
PCT Pub. Date: Dec. 27, 2018

(65) Prior Publication Data
US 2020/0109890 A1    Apr. 9, 2020

Related U.S. Application Data

(60) Provisional application No. 62/523,938, filed on Jun. 23, 2017.

(51) Int. Cl.
F25D 23/02    (2006.01)
B60J 5/12     (2006.01)
B60J 5/06     (2006.01)

(52) U.S. Cl.
CPC .............. F25D 23/023 (2013.01); B60J 5/06 (2013.01); B60J 5/12 (2013.01)

(58) Field of Classification Search
CPC .......... Y10T 24/44043; Y10T 24/4406; B65D 90/021; B65D 90/56; B65D 90/62; B65D 90/623
See application file for complete search history.

(56) References Cited

U.S. PATENT DOCUMENTS 1,843,505 A * 2/1932 Gonzale ............... B65D 88/005
                                                     220/1.5
3,051,232 A * 8/1962 Lamb .................. E04F 10/0607
                                                     160/368.1
(Continued)

FOREIGN PATENT DOCUMENTS

CN    102864939 B    9/2014
DE      3345970 A1   6/1985
(Continued)

OTHER PUBLICATIONS

Anonymous, "AKON Curtain and Divider—Insulated Curtain Walls", online retrieved <URL:https://www.curtain-and-divider.com/industrial-insulated-curtains/insulated-curtain-walls/>, 12 pages.
(Continued)

Primary Examiner — Ana M Vazquez
(74) Attorney, Agent, or Firm — Cantor Colburn LLP

(57) ABSTRACT

A container refrigeration unit (10) is provided. The container refrigeration unit includes a container (20), a curtain (30), a seal element (40) and a sealing adapter (50). The container includes sidewalls defining an open end (26) and a curtain track (27) proximate the open end. The curtain is sized to cover the open end. The sealing adapter is fittable to the curtain track. An entire periphery of the curtain and an entirety of the seal element are sequentially fittable to the sealing adapter.

19 Claims, 3 Drawing Sheets

(56) References Cited

U.S. PATENT DOCUMENTS

| | | | | |
|---|---|---|---|---|
| 3,294,034 | A | * | 12/1966 | Bodenheimer ...... B65D 90/021 |
| | | | | 410/1 |
| 3,591,034 | A | * | 7/1971 | Lohr ...................... B65D 88/14 |
| | | | | 220/1.5 |
| 3,618,803 | A | * | 11/1971 | Dobberkau .......... B65D 88/127 |
| | | | | 220/1.5 |
| 3,632,154 | A | | 1/1972 | Woodrich |
| 3,638,450 | A | | 2/1972 | Falk |
| 3,782,758 | A | | 1/1974 | Williamson |
| 4,046,186 | A | * | 9/1977 | Nordstrom ................ B60P 7/04 |
| | | | | 160/368.1 |
| 4,453,584 | A | | 6/1984 | Steele |
| 4,601,405 | A | * | 7/1986 | Riemer .................... B64D 9/00 |
| | | | | 160/368.1 |
| 4,621,856 | A | | 11/1986 | McKenzie |
| 4,669,775 | A | | 6/1987 | Mathers |
| 4,993,574 | A | * | 2/1991 | King ...................... B65D 88/14 |
| | | | | 220/1.5 |
| 5,010,943 | A | | 4/1991 | Boyer |
| 5,028,087 | A | | 7/1991 | Ells |
| 5,259,323 | A | * | 11/1993 | Koch ..................... B60D 5/003 |
| | | | | 105/20 |
| 6,105,653 | A | | 8/2000 | Armstrong |
| 6,751,969 | B1 | | 6/2004 | Moran et al. |
| 7,393,034 | B1 | | 7/2008 | Brussard et al. |
| 8,201,871 | B1 | * | 6/2012 | Rydberg .................... B60J 5/14 |
| | | | | 296/24.45 |
| 9,333,991 | B2 | | 5/2016 | Petelka |
| 9,587,875 | B2 | * | 3/2017 | Cresswell ............. F25D 11/003 |
| 10,322,870 | B1 | * | 6/2019 | Knight ................. B65D 88/127 |
| 2003/0005559 | A1 | * | 1/2003 | Verret ........................ G09F 1/12 |
| | | | | 24/462 |
| 2003/0102698 | A1 | | 6/2003 | Stevens et al. |
| 2005/0051544 | A1 | * | 3/2005 | Looker ................ B65D 90/021 |
| | | | | 220/1.5 |
| 2005/0103779 | A1 | * | 5/2005 | Xie ...................... B65D 88/121 |
| | | | | 220/1.5 |
| 2006/0064993 | A1 | * | 3/2006 | Tofflemire ......... B60H 1/00014 |
| | | | | 62/132 |
| 2006/0249509 | A1 | * | 11/2006 | Solano ................... B65D 90/08 |
| | | | | 220/1.5 |
| 2008/0030043 | A1 | | 2/2008 | Camps |
| 2008/0263835 | A1 | * | 10/2008 | Lapouge ............... F16B 5/0692 |
| | | | | 24/586.11 |
| 2012/0118003 | A1 | * | 5/2012 | Stone ................... B65D 88/745 |
| | | | | 62/440 |
| 2015/0082586 | A1 | * | 3/2015 | Bachmann ................ B64F 1/30 |
| | | | | 24/592.1 |
| 2017/0096295 | A1 | * | 4/2017 | Pherson ................... B64D 9/00 |
| 2017/0113870 | A1 | | 4/2017 | Peter |

FOREIGN PATENT DOCUMENTS

| | | |
|---|---|---|
| DE | 20303332 U1 | 4/2003 |
| DE | 10210773 C1 | 8/2003 |
| DE | 202008010516 U1 | 12/2009 |
| DE | 102014012557 A1 | 3/2016 |
| DE | 202016102856 U1 | 7/2016 |
| EP | 0508818 A2 | 10/1992 |
| EP | 0933250 A1 | 8/1999 |
| EP | 1961615 B1 | 2/2012 |
| EP | 3015301 A1 | 5/2016 |
| EP | 3153349 A1 | 4/2017 |
| GB | 2102671 A | 2/1983 |
| JP | 4187161 B2 | 11/2008 |
| JP | 2016165971 A | 9/2016 |
| WO | 2001012468 A1 | 2/2001 |

OTHER PUBLICATIONS

Anonymous, "Knowledge Publications—Heating and Cooling Your Home", online retrieved URL:<http://knowledgepublications.com/index.htm>, 29 pages.

Anonymous, "Randall Warehouse—InsulWall", online retrieved, <URL:http://randallmfg.com/warehouse/products/insulwall-warehouse-divider-curtain/?_vsrefdom=adwords&gclid=CIbR2Pfi99MCFRBMDQodePAKrw>,5 pages.

ISR/WO, Issued Nov. 26, 2018, U301301PCT, 19 pages.

* cited by examiner

FIG. 1
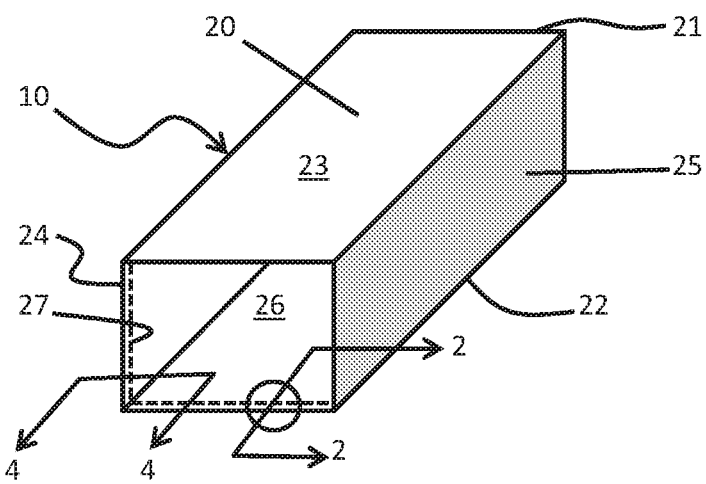
FIG. 4
FIG. 2
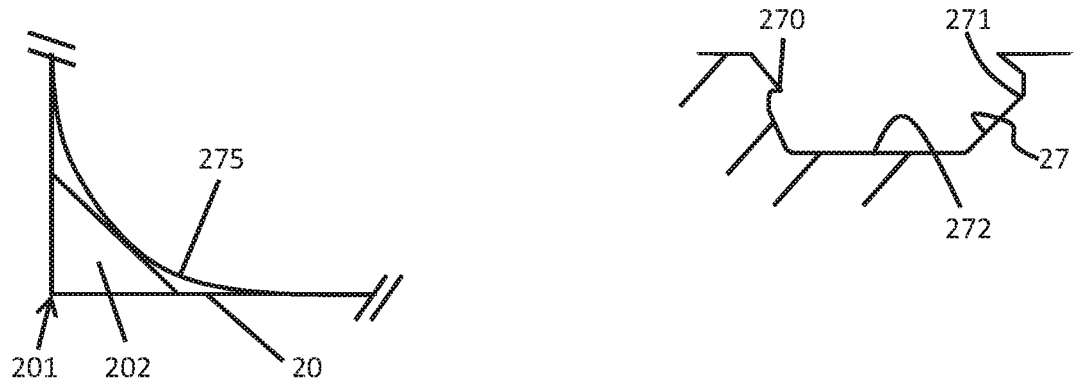
FIG. 3
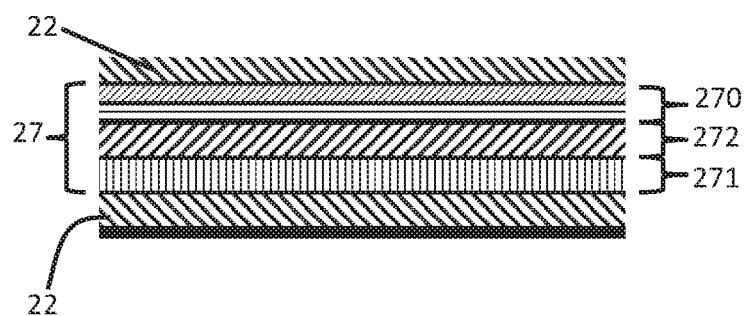

CURTAIN TRACK SEAL

CROSS-REFERENCE TO RELATED APPLICATIONS

This application claims the benefit of PCT/US2018/038974 filed Jun. 22, 2018, which claims priority to U.S. Provisional Application No. 62/523,938 filed Jun. 23, 2017, which is incorporated herein by reference in its entirety.

BACKGROUND

The following description relates to container refrigeration units and, more specifically, to a curtain track sealing adapter.

A curtain is often used to seal the rear doors of a container refrigeration unit that uses a controlled atmosphere (CA) air quality system. The curtain is typically installed by way insertion of a flat plastic ribbon over the curtain and into a curtain track that is formed in the container walls. This procedure can be tedious and inconsistent, however, and such tedium and inconsistency can lead to variability on the rear door seal. For example, if the process is not undertaken carefully, the curtain could be damaged and such damage could cause an air leak that will prevent the CA air quality system from operating properly.

BRIEF DESCRIPTION

According to an aspect of the disclosure, a container refrigeration unit is provided and includes a container that includes sidewalls defining an open end and a curtain track proximate the open end, a curtain sized to cover the open end, a seal element and a sealing adapter fittable to the curtain track. The sealing adapter is formed to define a cavity receptive of an entire periphery of the curtain and an entirety of the seal element.

In accordance with additional or alternative embodiments, the sidewalls include two pairs of opposite sidewalls.

In accordance with additional or alternative embodiments, the curtain track includes rounded corner sections.

In accordance with additional or alternative embodiments, the curtain has slack to cover the open end.

In accordance with additional or alternative embodiments, the seal element includes cord stock.

In accordance with additional or alternative embodiments, the sealing adapter includes polymeric material.

In accordance with additional or alternative embodiments, the sealing adapter is snap-fittable into the curtain track and the sealing adapter is formed to define a cavity receptive of the entire periphery of the curtain and the entirety of the seal element.

In accordance with additional or alternative embodiments, a length of the sealing adapter is substantially similar to a length of the curtain track.

According to another aspect of the disclosure, a sealing adapter is provided for use with a curtain track. The sealing adapter includes a first flange, a second flange and a body. The first flange includes a first surface and a first interior face. The second flange includes a second surface and a second interior face opposite and at a distance from the first interior face. The body is formed of compliant material integrally connected with the first and second flanges and includes a first side defining a cavity which extends from the first interior face to the second interior face and a second side opposite the first side. The second side includes a male section extending from the first surface, a female section extending from the second surface and an additional section extending between the male and female sections.

In accordance with additional or alternative embodiments, the first flange, the second flange and the body extend along a substantial entirety of the curtain track.

In accordance with additional or alternative embodiments, the body includes polymeric material.

In accordance with additional or alternative embodiments, the first surface is abuttable with a first side of the curtain track, the second surface is abuttable with a second side of the curtain track and the second side of the body conforms to an interior topography of the curtain track.

In accordance with additional or alternative embodiments, the cavity is receptive of a section of a curtain and a seal element.

In accordance with additional or alternative embodiments, the cavity extends annularly between corresponding interior edges of the first and second interior faces.

In accordance with additional or alternative embodiments, the male section is convex and the female section is concave.

According to yet another aspect of the disclosure, a method of closing an open end of a container of a container refrigeration unit is provided. The method includes sizing a curtain to cover the open end, fitting a sealing adapter into a curtain track defined by sidewalls of the container, receiving, within a cavity defined by the sealing adapter, an entire periphery of the curtain and receiving, within the cavity and atop the entire periphery of the curtain, an entirety of a seal element.

In accordance with additional or alternative embodiments, the receiving of the entire periphery of the curtain in the cavity is conducted from end-to-end.

In accordance with additional or alternative embodiments, the receiving of the entirety of the seal element in the cavity is conducted from end-to-end.

In accordance with additional or alternative embodiments, the fitting of the sealing adapter into the curtain track includes press-fitting.

In accordance with additional or alternative embodiments, the fitting of the sealing adapter into the curtain track includes compressing opposite sides of the sealing adapter together, tilting the compressed sealing adapter relative to the curtain track, inserting the compressed and tilted sealing adapter into the curtain track, leveling the sealing adapter relative to the curtain track and releasing the compression of the sealing adapter inside the curtain track.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

FIG. 1 is a perspective view of a container of a container refrigeration unit in accordance with embodiments;

FIG. 2 is an enlarged cross-sectional view of a portion of the container of FIG. 1 taken along lines 2-2 of FIG. 1;

FIG. 3 is an enlarged top-down view of the encircled portion of the container of FIG. 1;

FIG. 4 is an axial view of a portion of the container of FIG. 1 taken along lines 4-4 of FIG. 1;

DETAILED DESCRIPTION

Figure 7:
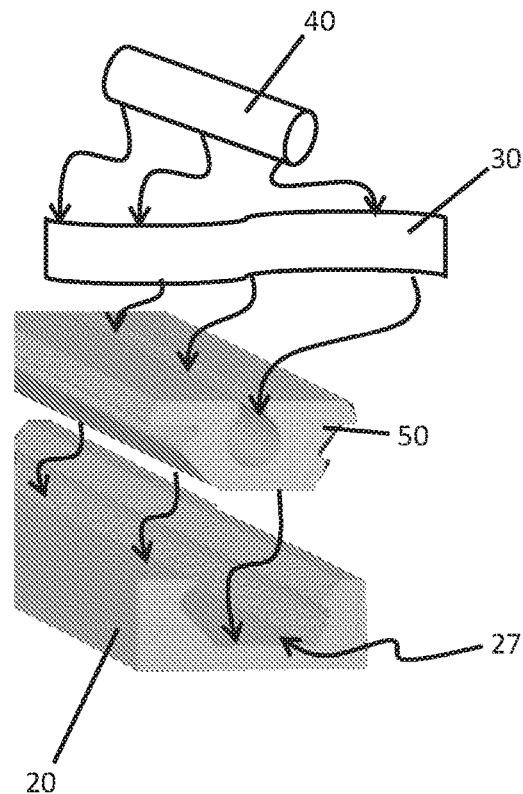
FIG. 7 illustrates a sequence of closing an open end of a container of a container refrigeration unit.

As will be described below, a curtain track sealing adapter is provided and will provide for a reliable and repeatable way to seal container doors while allowing the curtain to be installed quickly and easily. The adapter will fit into existing curtain tracks and will form a new sealing interface with the curtain. That is, the adapter will be formed to define a cavity in which a seal can be used to hold the curtain against an interior face of the adapter.

With reference to FIGS. 1-4, a container refrigeration unit 10 is provided and includes a container 20 and may additionally include a transport refrigeration unit (TRU) or another similar type of device for conditioning an interior of the container 20. The container 20 includes at least an end wall 21, a bottom sidewall 22, a top sidewall 23 opposite the bottom sidewall 22, a first sidewall 24 and a second sidewall 25 opposite the first sidewall 24. The bottom sidewall 22, the top sidewall 23, the first sidewall 24 and the second sidewall 25 are formed to define an open end 26 and a curtain track 27 that may be but is not required to be located proximate to the open end 26.

As shown in FIGS. 2 and 3, the curtain track 27 may be formed in the respective bodies of the bottom sidewall 22, the top sidewall 23, the first sidewall 24 and the second sidewall 25. In any case, the curtain track includes a male side 270, a female side 271 opposite the male side 270 and a bottom wall 272. As shown in FIG. 4, the corners 201 of the container 20 where two adjacent ones of the bottom sidewall 22, the top sidewall 23, the first sidewall 24 and the second sidewall 25 meet may form a fillet 202 with the proximal sections of the curtain track 27 forming rounded corner sections 275.

Figure 5:
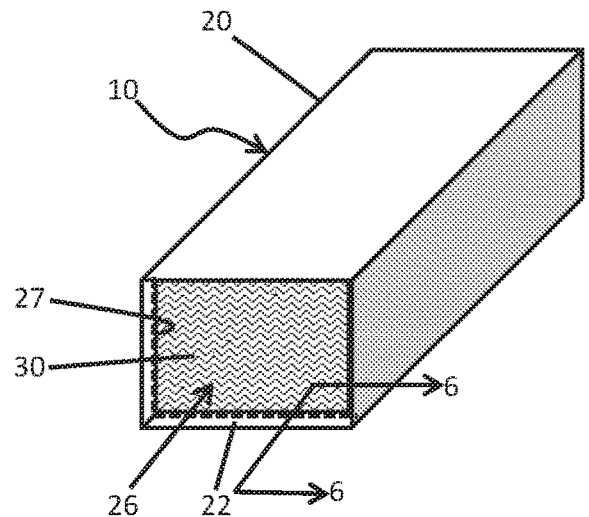
FIG. 5 is a perspective view of the container of FIG. 1 with a curtain covering an open end thereof in accordance with embodiments.
Figure 6:
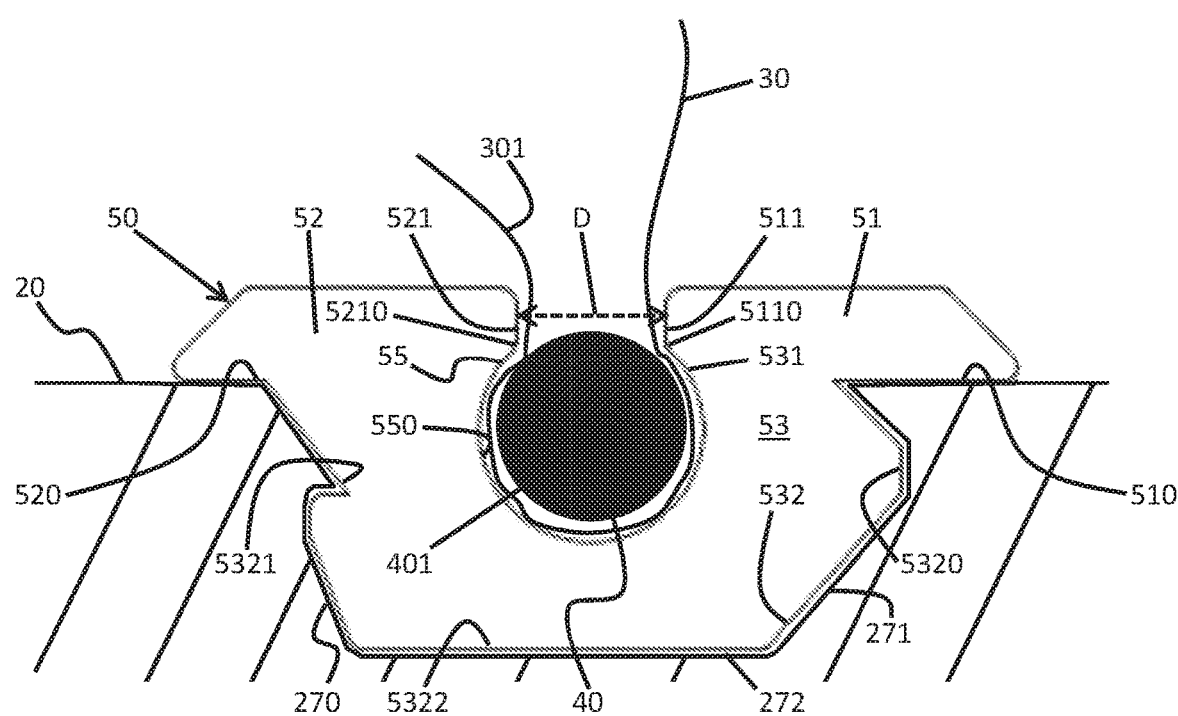
FIG. 6 is an enlarged cross-sectional view of a sealed curtain of FIG. 5 taken along lines 6-6 of FIG. 5.

With reference to FIGS. 5-7, the container refrigeration unit 10 may further include a curtain 30, which is sized to cover the open end 26 with slack, a seal element 40, which may be provided as cord stock 401 (e.g., o-ring cord stock), and a sealing adapter 50 formed of compliant material (e.g., polymeric material or another similar type of material). The sealing adapter 50 is fittable to the curtain track 27 either by insertion of the sealing adapter 50 into the curtain track 27 or by some other process whereby the sealing adapter 50 is fitted or affixed to the curtain track 27 (e.g., by being zipped to the curtain track 27 by a zipper or another similar device). As shown in FIG. 5, an entire periphery 301 of the curtain 30 and an entirety of the seal element 40 are sequentially fittable to the sealing adapter 50.

In accordance with embodiments and, as will be discussed below, the sealing adapter 50 may be snap-fittable into the curtain track 27. In addition, with a length of the sealing adapter 50 being substantially similar to a length of the curtain track 27, the sealing adapter 50 may be formed to define a cavity 55 that is receptive of the entire periphery 301 of the curtain 30 and the entirety of the seal element 40.

In accordance with embodiments and, as shown in FIGS. 6 and 7, the sealing adapter 50 may include a first flange 51, a second flange 52 and a body 53.

The first flange 51 includes a first surface 510 and a first interior face 511. The first surface 510 is abuttable with and extends along an entirety of a surface of the container 20 at a first side of curtain track 27. The first interior face 511 is transversely oriented relative to the first surface 510. The second flange 52 includes a second surface 520 and a second interior face 521. The second surface 520 is abuttable with and extends along an entirety of a surface of the container 20 at a second side of curtain track 27. The second interior face 521 is transversely oriented relative to the second surface 520 and is disposed to oppose the first interior face 511 at a distance D from the first interior face 511.

The body 53 includes compliant material (the first and second flanges 51 and 52 may be made of the compliant material as well) and is integrally connected with the first and second flanges 51 and 52. The body 53 includes a first side 531 and a second side 532 opposite the first side 531.

The first side 531 is formed to define the cavity 55 such that the outer wall of the cavity 55 extends along an annular curve 550 from an interior edge 5110 of the first interior face 511 to a corresponding interior edge 5210 of the second interior face 521. Each portion of the cavity 55 is thus receptive of a corresponding section of the curtain 30 and a corresponding section of the seal element 40.

The second side 532 conforms to an interior topography of the curtain track 27. That is, the second side includes a convex male insert section 5320 that extends from a proximal end of the first surface 510 to conform to the female side 271 of the curtain track 27, a concave female insert section 5321 that extends from a proximal end of the second surface 520 to conform to the male side 270 of the curtain track 27 and an additional section 5322. The additional section 5322 extends between corresponding ends of the male section 5320 and the female section 5321 to conform to the bottom wall 272 of the curtain track 27.

In accordance with embodiments and, as shown in FIG. 6, a cross-sectional area of the cavity 55 exceeds a total cross-sectional area of the curtain 30 and the seal element 40. Meanwhile, the distance D between the first and second interior faces 511 and 521 is normally less than a diameter of the seal element 40 such that, once the curtain 30 and the seal element 40 are received in the cavity 55, the curtain 30 and the seal element 40 cannot be easily withdrawn from the cavity 55. As such, insertion of the curtain 30 and the seal element 40 into the cavity 55 may require that the sealing adapter 50 be temporarily deformed such that the first and second interior faces 511 and 521 are separated by a distance that exceeds the diameter of the seal element 40.

Figure 8:
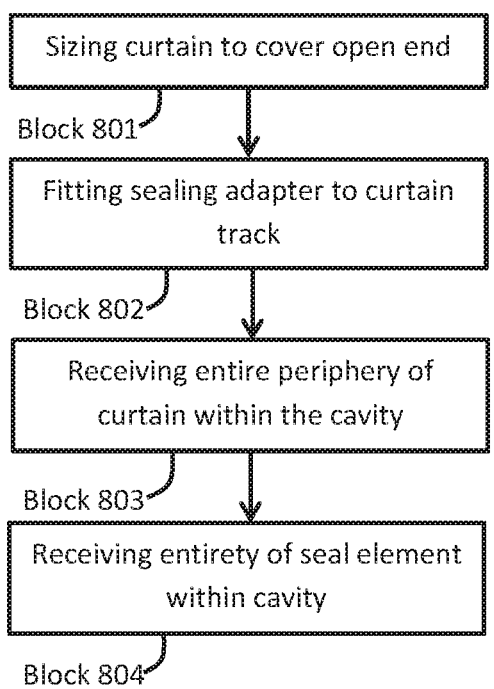
FIG. 8 is a flow diagram illustrating a method of closing an open end of a container of a container refrigeration unit in accordance with embodiments.
Figure 9:
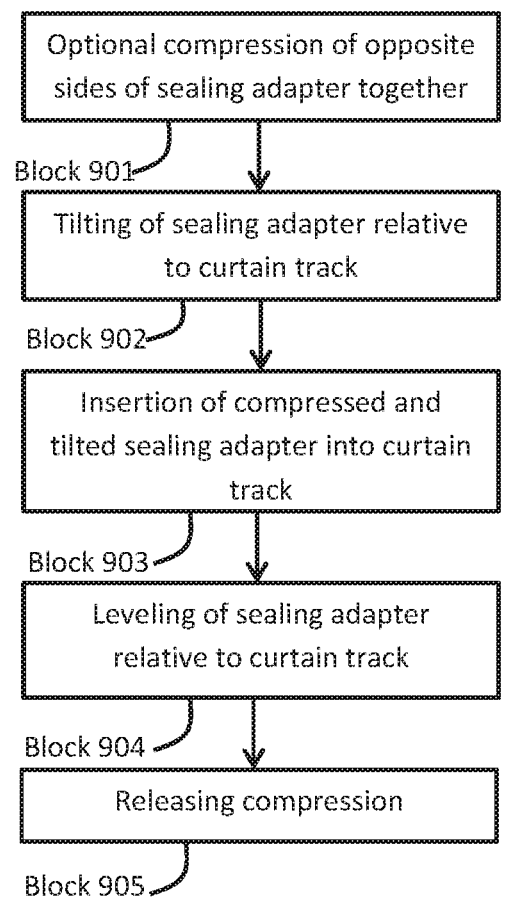
FIG. 9 is a flow diagram illustrating a method of installing a track seal into a curtain track in accordance with embodiments.

With reference to FIGS. 8 and 9, a method of closing the open end 26 of the container 20 of the container refrigeration unit 10 is provided. The method includes sizing the curtain 30 to cover the open end 26 (block 801) with or possibly without slack. The method further includes fitting the sealing adapter 50 to the curtain track 27 (block 802). In addition, the method includes receiving the entire periphery 301 of the curtain 30 within the cavity 55 (block 803) and receiving an entirety of the seal element 40 within the cavity 55 and atop the entire periphery 301 of the curtain 30 (block 804).

It is to be understood that the receiving of the entire periphery 301 of the curtain 30 and the entirety of the seal element 40 of blocks 802 and 803 can be conducted prior to or after the sealing adapter 50 is fit to the curtain track 27.

Nevertheless, for purposes of clarity and brevity, this description relates only to the case in which the sealing adapter 50 is fit into the curtain track 27 prior to the receiving of the entire periphery 301 of the curtain 30 and of the entirety of the seal element 40 of blocks 803 and 804.

In accordance with embodiments, the receiving of the entire periphery 301 of the curtain 30 and the entirety of the seal element 40 in the cavity 55 may be conducted from end-to-end. That is, an end of the curtain 30 may be initially inserted into the cavity 55, a proximal portion of the curtain 30 may be inserted into the cavity 55, and so on until the end of the curtain 30 is installed in the cavity 55. The same process can be used for the seal element 40 except, in this case, the sealing adapter 50 may be deformed such that the first and second interior faces 511 and 521 are separated by a distance that exceeds the diameter of the seal element 40. Alternatively, the end of the curtain 30 may be initially inserted into the cavity 55 along with a corresponding end of the seal element 40 (again, with the sealing adapter 50 being deformed), the proximal portion of the curtain 30 may be inserted into the cavity 55 along with a proximal portion of the seal element 40, and so on until the ends of the curtain 30 and the seal element are both installed in the cavity 55. A tool may be provided to assist with the insertion of either or both the curtain 30 and the seal element 40 with respect to the cavity 55.

In accordance with further embodiments, the fitting of the sealing adapter 50 into the curtain track 27 may include a press-fitting process as will be described below and as shown in FIG. 9 or by another suitable process, such as zippering, adhering, fastening, etc. (these alternative processes may also be used for the receiving of the curtain 30 and the seal element 40 in the cavity 55).

As shown in FIG. 9, the fitting of the sealing adapter 50 into the curtain track 27 of block 802 may include an optional compression of opposite sides of the sealing adapter 50 together and about the curtain 30 and the seal element 40 if those features are already received in the cavity 55 (block 901) and a tilting of the compressed sealing adapter 50 relative to the curtain track 27 such that the convex male insert section 5320 points toward the curtain track 27 (block 902). The method further includes an insertion of the compressed and tilted sealing adapter 50 into the curtain track 27 with the convex male insert section 5320 leading the concave female insert section 5321 such that the convex male insert section engages with the female side 271 of the curtain track 27 (block 903). Next, the method includes leveling the sealing adapter 50 relative to the curtain track 27 such that the concave female insert section 5321 engages with male side 270 of the curtain track 27 (block 904). Subsequently, the method includes a release of the compression of the sealing adapter 50 inside the curtain track 27 (block 905).

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A container refrigeration unit, comprising:
    a container comprising sidewalls defining an open end and defining, in a plane in each respective body of each of the sidewalls, a curtain track proximate to the open end;
    a curtain sized to cover the open end;
    a seal element; and
    a sealing adapter fittable to the curtain track,
    wherein:
    an entire periphery of the curtain and an entirety of the seal element are sequentially fittable to the sealing adapter,
    the sealing adapter comprises:
    a single male insert section having a convex shape and which is receivable in a corresponding single female section of the curtain track; and
    a single female insert section having a concave shape and which is receivable in a corresponding single male section of the curtain track, and
    the sealing adapter is formed to define a cavity receptive of the entire periphery of the curtain and the entirety of the seal element, a cross-sectional area of the cavity exceeding a total cross-sectional area of the curtain and the seal element.

2. The container refrigeration unit according to claim 1, wherein the sidewalls comprise two pairs of opposite sidewalls.

3. The container refrigeration unit according to claim 1, wherein the curtain track comprises rounded corner sections.

4. The container refrigeration unit according to claim 1, wherein the curtain has slack to cover the open end.

5. The container refrigeration unit according to claim 1, wherein the seal element comprises cord stock.

6. The container refrigeration unit according to claim 1, wherein the sealing adapter comprises polymeric material.

7. The container refrigeration unit according to claim 1, wherein:
    the sealing adapter is snap-fittable into the curtain track; and
    a distance across an opening of the cavity is less than a diameter of the seal element.

8. The container refrigeration unit according to claim 1, wherein a length of the sealing adapter is substantially similar to a length of the curtain track.

9. A sealing adapter for use with a seal element, a curtain and a curtain track, which is defined in a plane in each respective body of each sidewall of a container and which is proximate to an open end of the container, the sealing adapter comprising:
    a first flange comprising a first surface and a first interior face;
    a second flange comprising a second surface and a second interior face opposite and at a distance from the first interior face; and
    a body comprising compliant material integrally connected with the first and second flanges, the body comprising:
    a first side, which is disposed to face inwardly relative to the open end of the container at the curtain track, and which defines a cavity which extends from the first interior face of the first flange to the second interior face of the second flange and which is receptive of the seal element and the curtain; and
    a second side opposite the first side, which is disposed to face outwardly relative to the open end of the container at the curtain track, and which comprises:

a single male insert section extending from the first surface and having a convex shape, which is receivable in a corresponding single female section of the curtain track;

a single female insert section extending from the second surface and having a concave shape, which is receivable in a corresponding single male section of the curtain track; and an additional section extending between the single male insert section and the single female insert section, wherein a cross-sectional area of the cavity exceeds a total cross-sectional area of the curtain and the seal element.

10. The sealing adapter according to claim 9, wherein the first flange, the second flange and the body extend along an entirety of the sealing adapter.

11. The sealing adapter according to claim 9, wherein the body comprises polymeric material.

12. The sealing adapter according to claim 9, wherein:
the first surface is abuttable with a first side of the curtain track,
the second surface is abuttable with a second side of the curtain track, and
the second side of the body with the single male insert section and the single female insert section conforms to an interior topography of the corresponding single female section and the corresponding single male section of the curtain track.

13. The sealing adapter according to claim 9, wherein a distance across an opening of the cavity is less than a diameter of the seal element.

14. The sealing adapter according to claim 9, wherein the cavity extends annularly between corresponding interior edges of the first and second interior faces.

15. A method of closing an open end of a container refrigeration unit, the method comprising:
sizing a curtain to cover the open end;
defining, in a plane in each respective body of each sidewall of the container, a curtain track;
fitting a sealing adapter into the curtain track, the sealing adapter comprising a single male insert section having a convex shape and which is receivable in a corresponding single female section of the curtain track and a single female insert section having a concave shape and which is receivable in a corresponding single male section of the curtain track;
receiving, within a cavity defined by the sealing adapter, an entire periphery of the curtain;
receiving, within the cavity and atop the entire periphery of the curtain, an entirety of a seal element; and
sizing the cavity such that a cross-sectional area thereof exceeds a total cross-sectional area of the curtain and the seal element.

16. The method according to claim 15, wherein the receiving of the entire periphery of the curtain in the cavity is conducted from end-to-end.

17. The method according to claim 15, wherein the receiving of the entirety of the seal element in the cavity is conducted from end-to-end.

18. The method according to claim 15, wherein the fitting of the sealing adapter into the curtain track comprises press-fitting.

19. The method according to claim 15, wherein the fitting of the sealing adapter into the curtain track comprises:
compressing opposite sides of the sealing adapter together;
tilting the compressed sealing adapter relative to the curtain track;
inserting the compressed and tilted sealing adapter into the curtain track;
leveling the sealing adapter relative to the curtain track; and
releasing the compression of the sealing adapter inside the curtain track.

* * * * *